(No Model.)
2 Sheets—Sheet 1.

H. R. WELLMAN.
BALL BEARING.

No. 506,409.  Patented Oct. 10, 1893.

Witnesses
Elmer R. Shipley
J. B. England

Inventor
Harold R. Wellman
By W. S. Boyd, Atty.

(No Model.) 2 Sheets—Sheet 2.

H. R. WELLMAN.
BALL BEARING.

No. 506,409. Patented Oct. 10, 1893.

Witnesses
Elmer R. Shipley
J. B. England

Inventor
Harold R. Wellman
By W. S. Boyd, Atty.

ated October 10, 1893.

UNITED STATES PATENT OFFICE.

HAROLD R. WELLMAN, OF DULUTH, MINNESOTA.

BALL-BEARING.

SPECIFICATION forming part of Letters Patent No. 506,409, dated October 10, 1893.
Application filed January 26, 1893. Serial No. 459,831. (No model.)

*To all whom it may concern:*

Be it known that I, HAROLD R. WELLMAN, a citizen of the United States, residing at Duluth, in the county of St. Louis and State of Minnesota, have invented certain new and useful Improvements in Ball-Bearings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to ball bearings in which a spiral or screw is used, and has for its object to provide a means by which such spiral or screw may be used to operate another part as a gear wheel or rack and consists in the construction and arrangements of parts as will be hereinafter more fully set forth.

Figure 2:
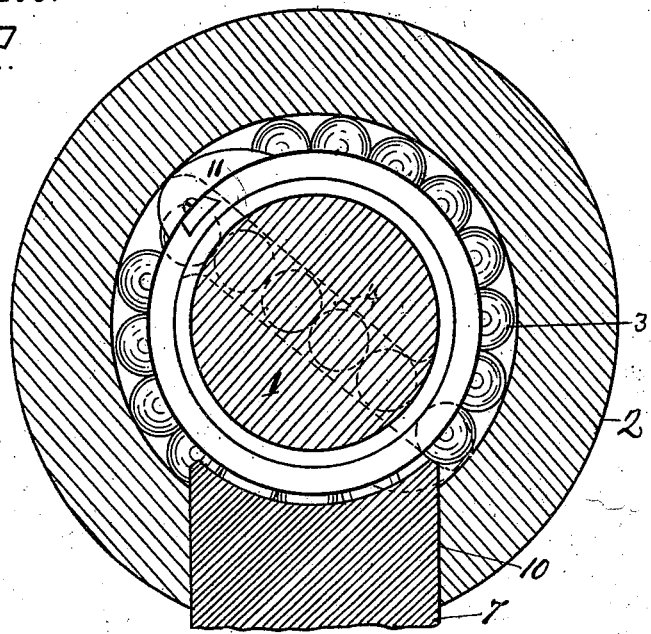
Figure 1:
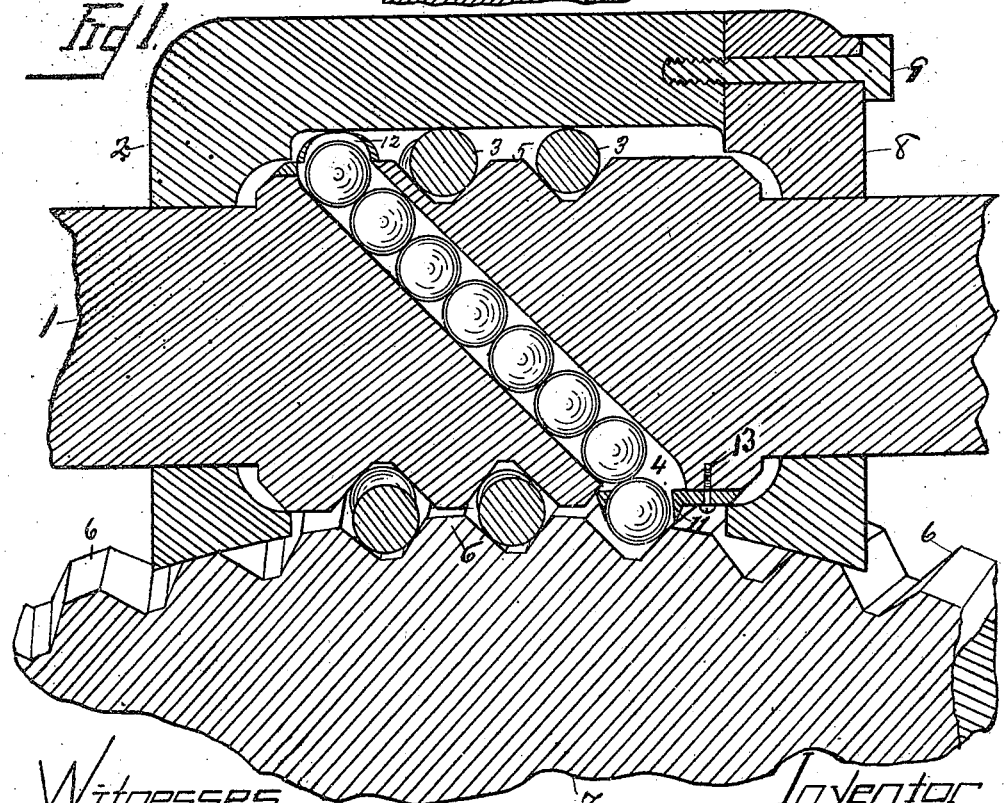

Referring to the accompanying drawings in which the same reference numerals indicate corresponding parts in the different views: Figure 1 is a longitudinal sectional view of a worm gear provided with my improved bearing, and Fig. 2 is a cross sectional view of the same, and Figs. 3 and 4 are sectional views showing how the balls can be returned through the casing.

Heretofore, in using ball bearings in connection with a thread or spiral, it has been the practice to return the balls externally of the worm or shaft, as through the nut. But such a construction is not practicable or desirable in all places, and therefore I have invented a bearing in which the balls may be returned through the shaft or worm, itself.

In the accompanying drawings, I have shown one form of carrying my invention into practice, in which 1, indicates the shaft, 2 the bearing or casing therefor and 3 the balls. The shaft may be journaled in bearings or casing in any desired manner and is provided with a channel or by pass, 4, through which the balls are returned to any desired point of the worm, or threads, 5, after having engaged with the teeth 6, of the wheel, 7, which is being driven or operated. The channel 4 has its ends or openings on different sides of the shaft, and is preferably made diagonally through the shaft, but it may be curved to a greater or less extent, or even made substantially axial. The casing is provided with a head or cap 8 which is secured thereto in any ordinary manner as by bolts 9 or there may be a head at each end, and one side of the casing is provided with a slot or channel 10 through which the edge of the wheel 7 projects far enough to be engaged by the balls. The bore of the casing is substantially smooth and cylindrical and so much larger than the shaft that the balls, as they move around with the shaft, bear against the interior of the casing and are prevented from getting out of their proper position. As the casing and shaft are longitudinally stationary relatively to each other the balls must move longitudinally of the casing the distance of the pitch of the screw for every revolution they make of the shaft, and as they do not necessarily travel this distance at every revolution of the shaft, it is evident they do not always travel around the casing in the same path. Hence it is absolutely necessary that the interior or bore of the casing be substantially cylindrical or of the same diameter, except the slot, at which point the edge of the wheel or other movable part enters and completes the cylindrical form of the bore and holds the balls in position. By joining the ends of the spiral groove between the threads by the by-pass, a continuous channel or path is made for the balls so that they can be made to pass from one end of the spiral groove to the other which ever way the shaft is rotated, thus permitting of the shaft being run in either direction according to which way it is desired to rotate the wheel. When the balls reach the end of the spiral groove, it is necessary to provide some means to force them into the by-pass and prevent them from being caught between the shaft and the interior of the casing at the end of the groove. I prefer to do this by means of hoods 11, which fit over the union of the by-pass and the spiral groove one at each end, each hood being provided with a semi-circular groove or channel 12, upon its under side through which the balls pass from the groove to the by-pass. The top of this hood is of such a height as to pass around within the bore of the casing, and also through the teeth of the wheel without touching. The hoods may each be secured to the shaft by providing its lower portion with a dove tail which fits in a corresponding dove tail slot or recess at each end which leads into the end of the spiral groove. A bolt 13 may be passed through a portion of the hood into the shaft for preventing its accidental misplacement.

Figure 3:
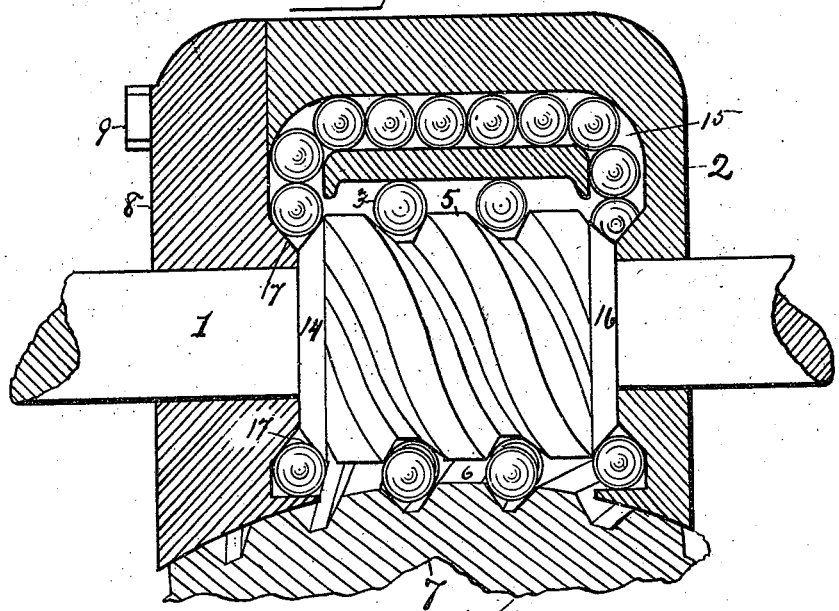
Figure 4:
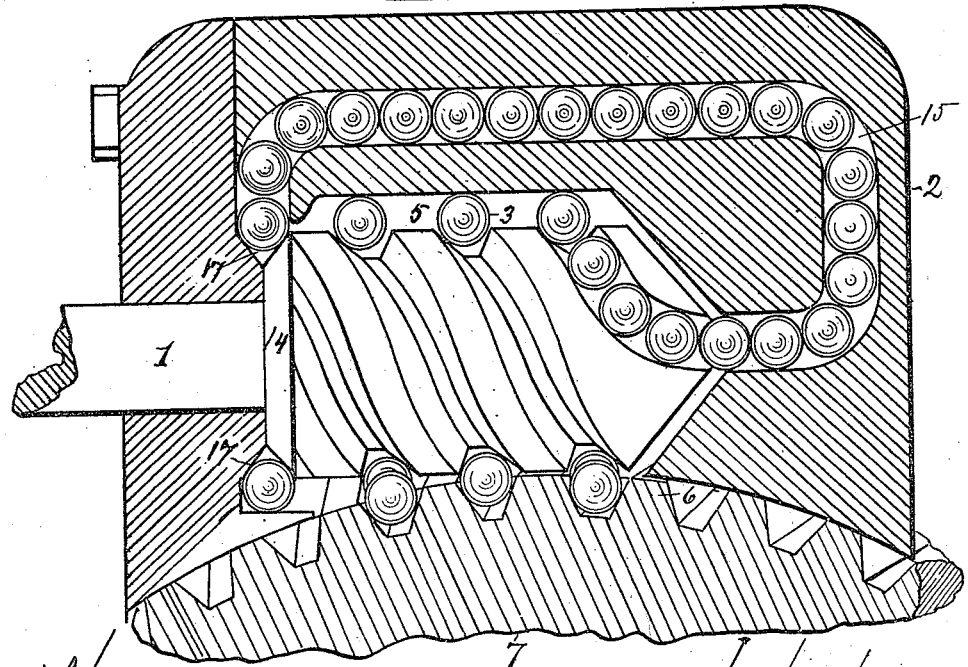

Instead of returning the balls through the shaft, it is evident that they might be returned through the casing, but it would require a slight change in the groove on the surface of the shaft, for this purpose, as a spiral groove could be terminated in an annular groove or channel 14 around the shaft as shown in Fig. 3, into which the balls would pass and from which they would be fed or forced into a channel or by-pass 15 in the casing, the opposite end of which channel would terminate opposite another annular channel 16, around the shaft, from which the spiral would lead off. Or the spiral groove might terminate in an axial line with the end of the shaft, and the end of the shaft could be tapered and have the spiral groove extended down to the point so as to engage with the balls as they pass out of the channel 15 of the casing and force them into the main spiral on the shaft 17. To utilize the bearing as a step or support for a vertical shaft, or for taking up the end thrust of a horizontal shaft, the casing may be provided with an inward projection which may be provided with a partial groove which together with a partial groove around the shaft will form the annular groove around the shaft.

As above described, my invention is capable of use in many places, as in electrical cars when the shaft of the armature is placed longitudinally of the car and in electrical elevators, &c., in which the shaft and casing are longitudinally stationary relatively to each other, or for an expansible gear, as for hoisting, in which the shaft and the casing are longitudinally movable relatively to each other, in all of which places the friction will be reduced to a minimum and the pitch of the screw can be such that the shaft may be rotated to a certain extent by the gear.

I do not wish to be understood as limiting myself to the exact construction shown and described, as it is evident that changes may be made in the same without departing from the spirit of my invention.

Having thus described my invention, I claim—

1. In combination, a casing provided with a slot in one side and having a smooth cylindrical bore of a uniform diameter, a shaft of a less diameter than the bore of the casing and axially journaled therein, said shaft and casing being longitudinally stationary relatively to each other, and the shaft being provided with a spiral groove and a by-pass connecting two points of said groove, a movable toothed part within the slot of the casing, and a series of balls within the groove and the by-pass of the shaft, the diameter of the balls being such that they will engage with the walls of the groove and with the interior of the casing and the teeth of the movable part, substantially as set forth.

2. In combination, a casing provided with a slot in one side and having a smooth cylindrical bore of a uniform diameter, a shaft of a less diameter than the bore of the casing and axially journaled therein, said shaft and casing being longitudinally stationary relatively to each other, and the shaft being provided with a spiral groove and with a by-pass connecting two points of the groove, a hood over the entrance into the by-pass for deflecting the balls thereinto, a movable toothed part projecting through the slot in the casing, and a series of balls within the groove and the by-pass, and engaging with the toothed part, substantially as set forth.

3. The combination, with a shaft having a spiral groove and an internal by-pass extending through the shaft and connecting two points of the groove upon opposite sides of the shaft, of a casing for the shaft, a movable part provided with teeth extending through a slot in the casing, and a series of balls within the groovs and by-pass of the shaft, and engaging with said toothed part.

4. The combination, with a shaft having a spiral groove and an internal by-pass, of hoods secured to the shaft, over the unions of the groove and by-pass at each end, respectively, the under side of said hoods each being provided with a semi-circular groove, a casing over the shaft, a movable toothed part projecting through a slot in the casing, and a series of balls within the groove and by-pass and engaging with the teeth of the movable part.

In testimony whereof I affix my signature in presence of two witnesses.

HAROLD R. WELLMAN.

Witnesses:
JAMES H. MARSH,
ALFRED C. MARSH.